United States Patent
Nelson et al.

(10) Patent No.: US 6,434,821 B1
(45) Date of Patent: Aug. 20, 2002

(54) METHOD OF MAKING A COMBUSTION CHAMBER LINER

(75) Inventors: Christopher K. Nelson, West Chester; David B. Patterson, Mason; Eugene F. Pridgett, Fairfield, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/455,827

(22) Filed: Dec. 6, 1999

(51) Int. Cl.⁷ .............................. B21K 1/00; F02C 3/00
(52) U.S. Cl. ............... 29/888.01; 29/889.2; 29/890.01; 60/752; 60/757; 60/754; 60/755; 60/756
(58) Field of Search .................. 29/888.01, 889–889.2, 29/890.01; 60/39.36, 752, 757, 755, 754, 756

(56) References Cited

U.S. PATENT DOCUMENTS

| | | | | |
|---|---|---|---|---|
| 3,082,601 A | * | 3/1963 | Witt | |
| 3,597,821 A | * | 8/1971 | Emerson | |
| 3,603,082 A | * | 9/1971 | Sneeden et al. | |
| 3,920,360 A | * | 11/1975 | Bierlein | |
| 4,244,178 A | * | 1/1981 | Herman et al. | |
| 4,485,630 A | * | 12/1984 | Kenworthy | |
| 5,181,379 A | * | 1/1993 | Wakeman et al. | |
| 5,279,127 A | * | 1/1994 | Napoli | |

* cited by examiner

*Primary Examiner*—S. Thomas Hughes
*Assistant Examiner*—Eric Compton
(74) *Attorney, Agent, or Firm*—Andrew C. Hess; William Scott Andes

(57) ABSTRACT

A method of fabricating an annular liner for a combustion chamber of a gas turbine engine. The combustion chamber has a dome including a fuel nozzle for delivering fuel to the combustion chamber. A metal piece is formed into an annular section constituting at least a portion of the liner and having at least one seam extending generally axially with respect to an axial centerline of the liner. An upstream end of the liner is machined to have a registration feature for connecting the liner to the combustion chamber dome in at least one predetermined orientation with respect to the dome. Further, the method includes ensuring the registration feature and the seam are located relative to each other on the liner so the seam is at a preselected position with respect to the combustion chamber dome when the liner is connected to the combustion chamber dome in the predetermined orientation.

10 Claims, 6 Drawing Sheets

METHOD OF MAKING A COMBUSTION CHAMBER LINER

BACKGROUND OF THE INVENTION

The present invention relates generally to a method of making combustion chamber liners and more particularly to a method which improves the strength and durability of the liners.

Flowpath gases in gas turbine engines are mixed with fuel and burned to heat the gases. The mixing and burning occurs in an annular combustion chamber formed between an annular inner liner and an annular outer liner. A dome at the upstream end of the combustion chamber includes fuel nozzles which deliver fuel to the chamber and mix the fuel with the flowpath gases. This mixture is ignited and burned to heat the flowpath gases. The flowpath gases are not uniformly heated resulting in large thermal gradients around the inner and outer liners which produce large differences in stresses around the liners.

Most conventional liners are fabricated from sheet metal or forged rings. Sheet metal liners are made by brazing sheet metal rings together, and forged liners are made by welding forged rings together. Both types of rings usually have axial seams. Although some of these seams have reduced material properties and cause stress concentrations, no provision has been made heretofore to position the seams in areas of the liner having lower stresses. Thus, the strength and durability of conventional liners is generally limited by the reduced material properties found in the seams.

SUMMARY OF THE INVENTION

Among the several features of the present invention may be noted the provision of a method of fabricating an annular liner for a combustion chamber of a gas turbine engine. The combustion chamber has a dome including a fuel nozzle for delivering fuel to the combustion chamber. A metal piece is formed into an annular section constituting at least a portion of the liner and having at least one seam extending generally axially with respect to an axial centerline of the liner. An upstream end of the liner is machined to have a registration feature for connecting the liner to the combustion chamber dome in at least one predetermined orientation with respect to the dome. Further, the method includes ensuring the registration feature and the seam are located relative to each other on the liner so the seam is at a preselected position with respect to the combustion chamber dome when the liner is connected to the combustion chamber dome in the predetermined orientation.

In another aspect the method of the present invention includes the steps of forming a first metal piece into a first annular section having at least one welded seam extending generally axially with respect to an axial centerline of the liner and forming a second metal piece into a second annular section. The first and second annular sections are joined. An end of the second annular section is machined after the first and second annular sections are joined to have a registration feature for connecting the liner to the combustion chamber dome in at least one predetermined orientation. The registration feature is located relative to the seam so the seam is at a preselected position with respect to the combustion chamber dome when the liner is connected to the combustion chamber dome in the predetermined orientation.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
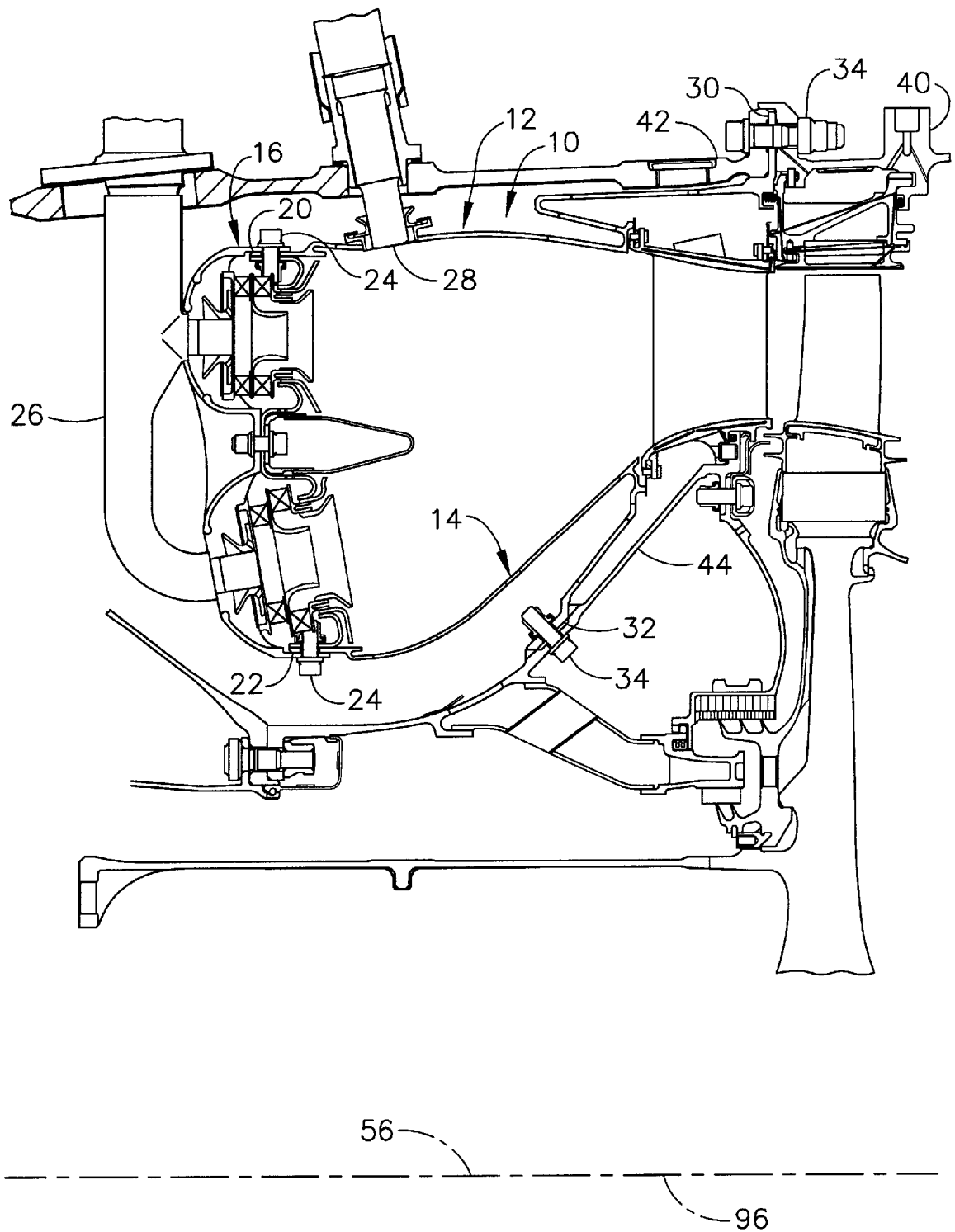
FIG. 1 is a partial vertical cross section of a gas turbine engine showing a combustion chamber.

Referring now to the drawings and in particular to FIG. 1, a combustion chamber of a gas turbine engine is designated in its entirety by the reference number 10. The chamber 10 is an annular chamber defined by an outer liner, generally designated by 12, and an inner liner, generally designated by 14, each of which are made by the method of the present invention. A conventional dome, generally designated by 16, defines an upstream boundary of the chamber 10. The dome 16 is connected to upstream ends 20, 22 of the outer and inner liners 12, 14, respectively, with fasteners 24.

Fuel nozzles 26 provided upstream from the dome 16 deliver fuel to the chamber. The dome 16 includes conventional apparatus for mixing the fuel with flowpath gases. Two conventional igniters 28 (only one of which is shown) are provided downstream from the dome 16 to ignite the mixed fuel and gases. The downstream ends 30, 32 of the outer and inner liners 12, 14, respectively, are connected with fasteners 34 to stator components such as a high pressure turbine shroud hanger 40, a compressor discharge nozzle support 42 and/or a high pressure turbine nozzle inner seal 44. With the exception of the outer and inner combustion chamber liners 12, 14, respectively, all of the previously mentioned components are conventional and will not be described in further detail.

Figure 2:
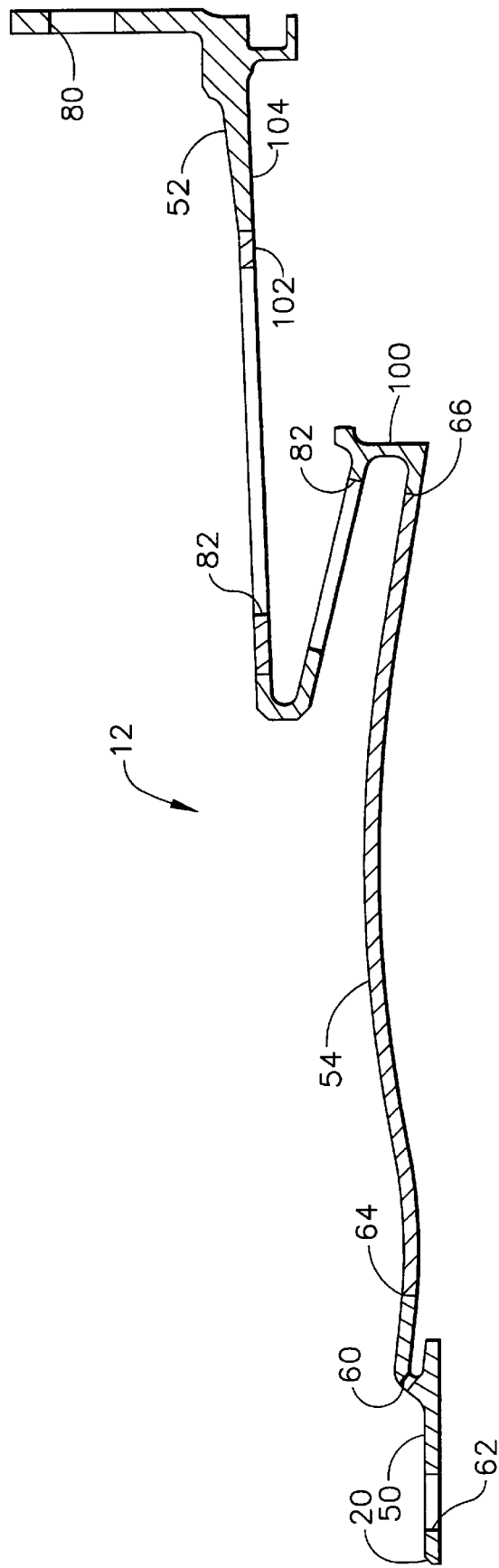
FIG. 2 is a vertical cross section of an outer combustion chamber liner.

As illustrated in FIG. 2, the outer liner 12 generally comprises a forged annular upstream section, an annular downstream section and an annular sheet metal section generally designated by 50, 52 and 54, respectively. These sections are concentric and surround a common centerline 56 (FIG. 1) which is coincident with the centerline of the gas turbine engine.

The upstream liner section 50 includes a row of recessed film cooling holes 60 for transporting cooling air through the liner and creating a fluid barrier between the liner and flowpath gases inside the liner. The holes 60 are recessed so they are shielded from hot flowpath gases extending downstream from the combustion chamber dome 16. A row of bolt holes 62 is provided at the upstream end 20 the liner for connecting the outer liner 12 to the combustion chamber dome 16 (FIG. 1).

The upstream section 50 is connected to the sheet metal section 54 at a welded circumferential seam 64. The sheet metal section 54 is generally cylindrical and may either be formed from one piece of sheet metal or from sheet metal panels. Regardless of whether the sheet metal section 54 is made from one or more pieces, the section is preferably unitary from the upstream section 50 to the downstream section 52. The sheet metal section 54 is connected to the downstream section 52 at another welded circumferential seam 66.

Figure 3:
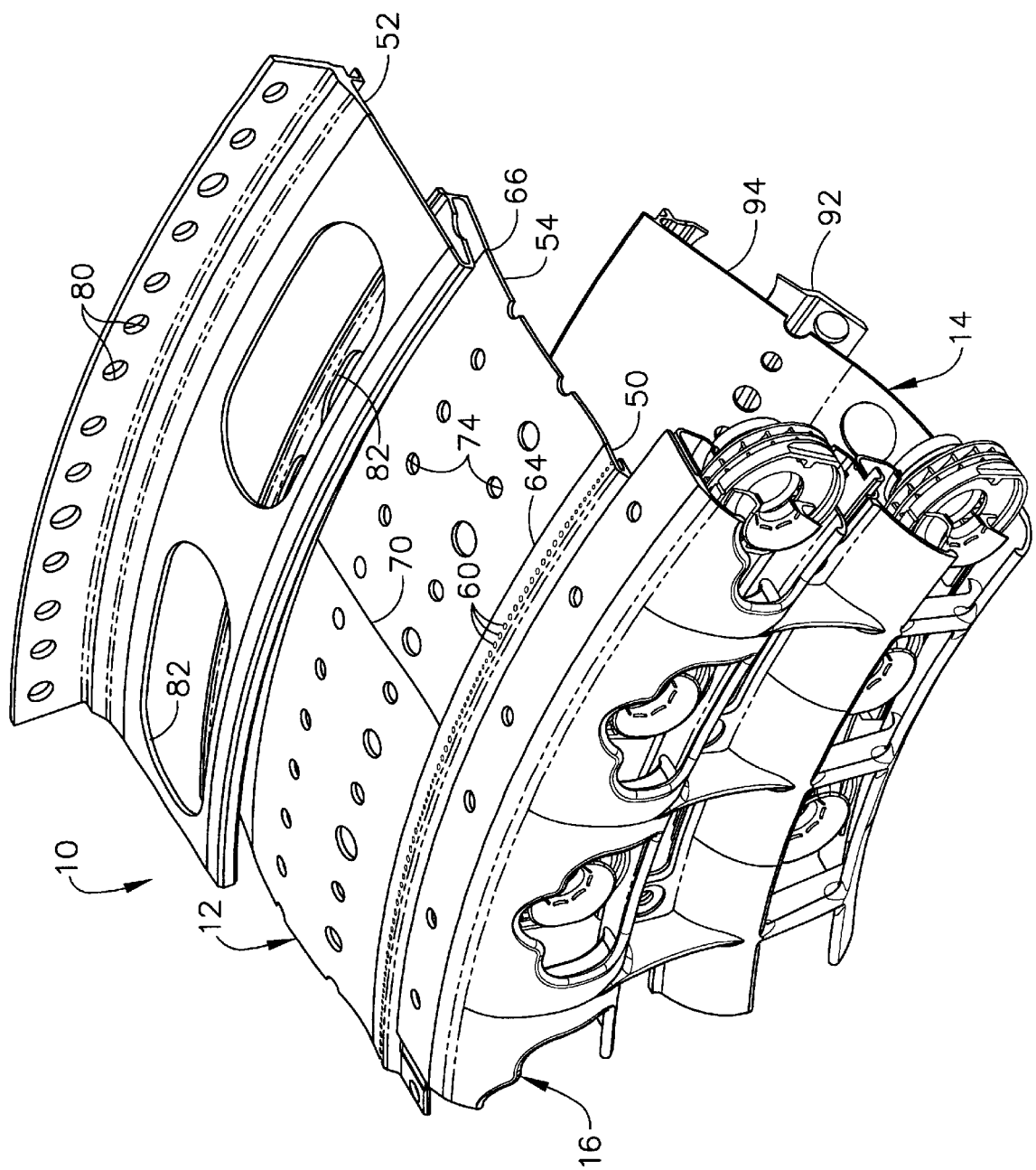
FIG. 3 is a partial perspective of a combustion chamber showing a seam in the outer liner.
Figure 4:
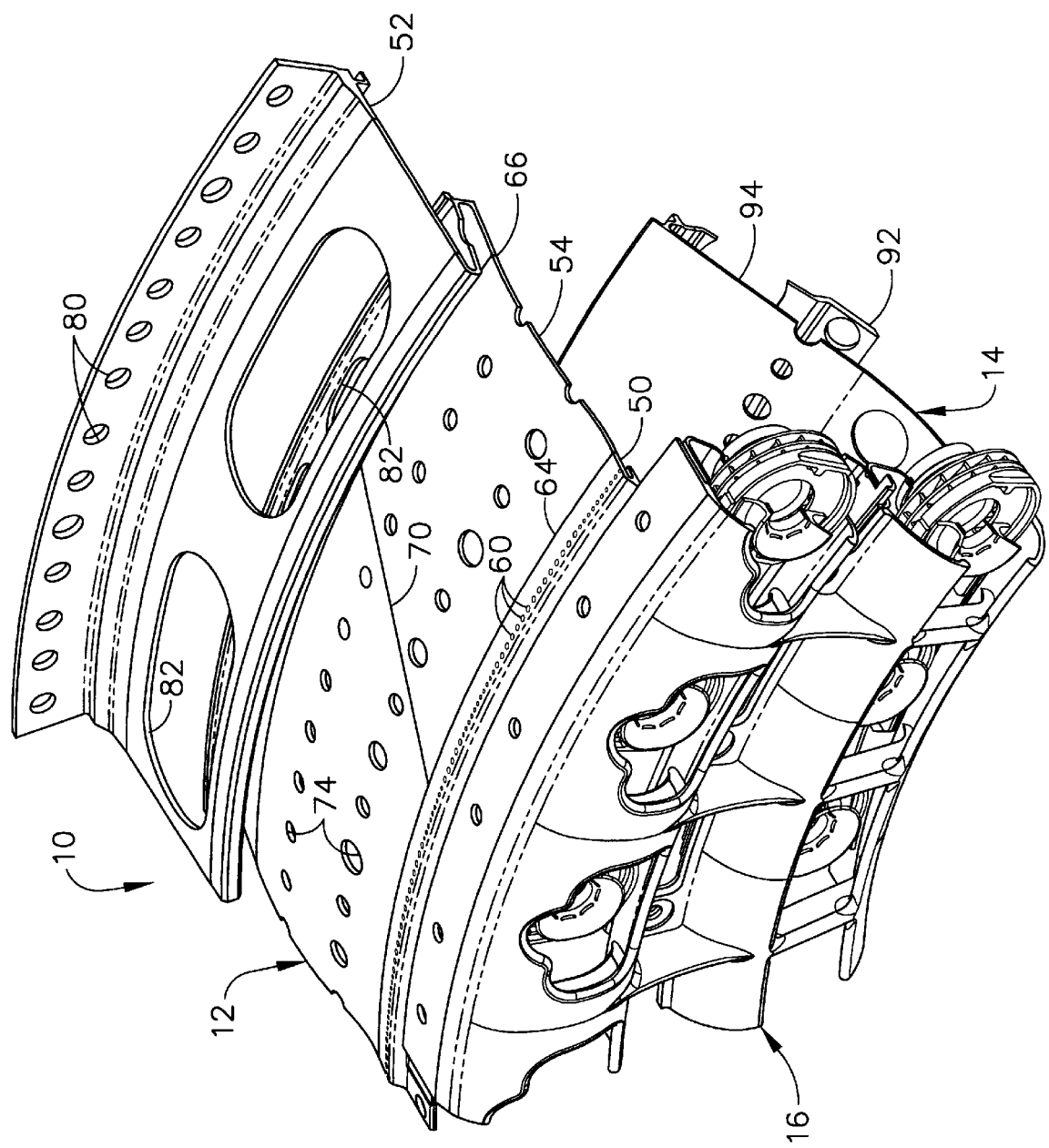
FIG. 4 is a partial perspective of a combustion chamber dome showing an alternative seam position.

As illustrated in FIG. 3, the sheet metal piece(s) has opposite side edges which are joined at a seam 70 extending generally axially between the annular sections 50, 52. Although the seam 70 may have other shapes without departing from the scope of the present invention, the seam 70 of the preferred embodiment lies in a single plane. The plane of the seam 70 may extend parallel to the liner centerline 56 (FIG. 1) between the upstream and downstream sections 50, 52, respectively, as shown in FIG. 3 or it may be angled with respect to the liner centerline as shown in FIG. 4. As will be apparent to those skilled in the art, the sheet metal section 54 has areas of higher amplitude stress and areas of lower amplitude stress primarily resulting from thermal gradients produced by hot flowpath gases extending downstream from each fuel nozzle 26 in the combustion chamber 10. Preferably, the seam 70 is positioned in an area of lower amplitude stress such as at an angular position around the liner centerline 56 midway between two of the fuel nozzles 26.

Figure 5:
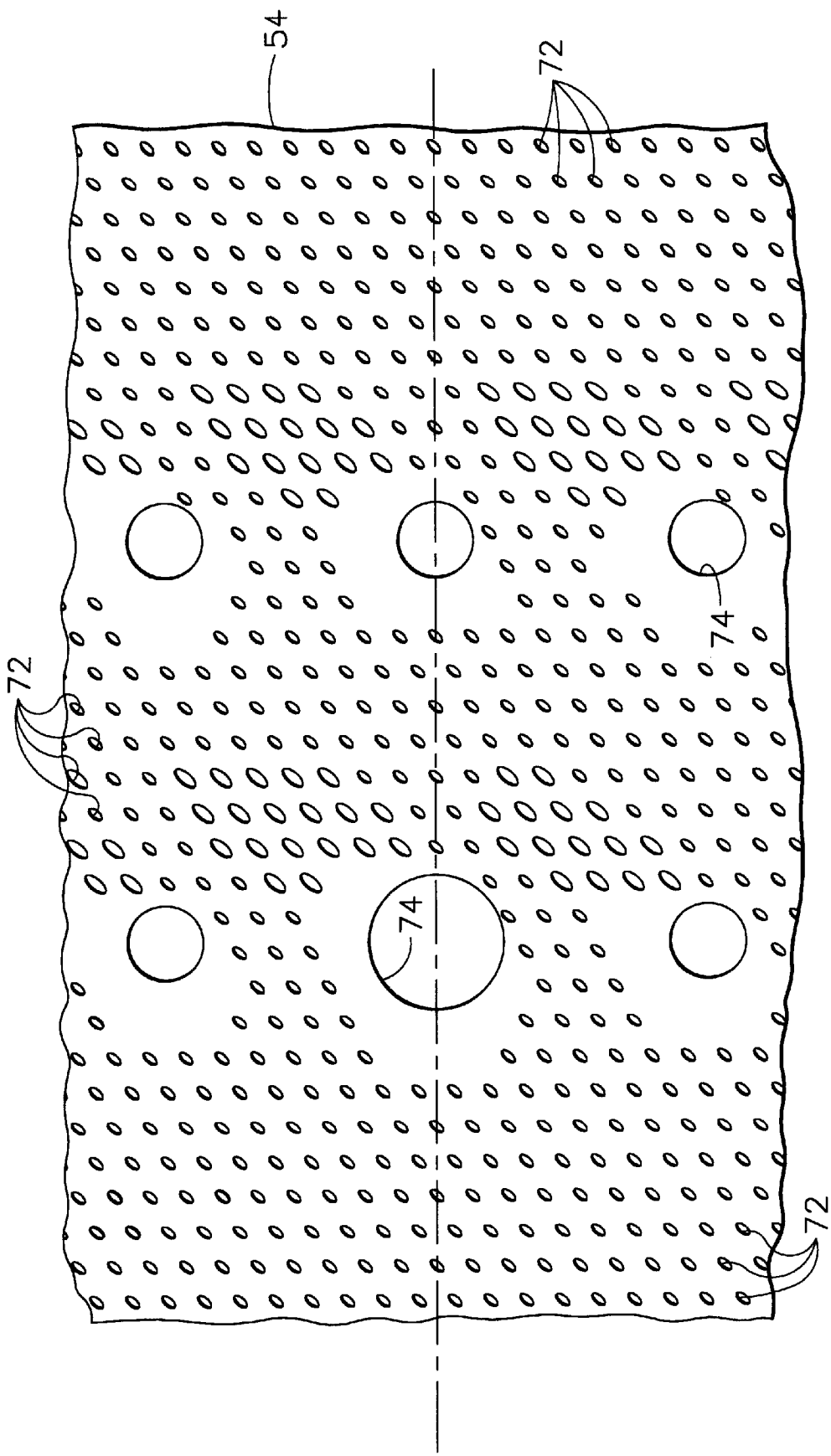
FIG. 5 is a partial top plan of an outer liner showing film cooling holes extending through a sheet metal section of the liner.

As illustrated in FIG. 5, the sheet metal section has a multiplicity of cooling holes 72 extending through the sheet metal section from an exterior surface of the sheet metal section 54 to an interior surface of the sheet metal section. These cooling holes 72 direct cooling air through the liner 12 and form a fluid thermal barrier between hot flowpath gases and the liner. Each of these cooling holes 72 is positioned on an unobscured line of sight with at least one of the plurality of fuel nozzles 26 in the combustion chamber dome 16. The sheet metal section 54 also has larger dilution holes 74 extending through the section from its exterior surface to its interior surface for controlling emissions and providing a desired thermal exit profile.

As further illustrated in FIG. 2, the downstream liner section 52 has a rearward flange having a circle of bolt holes 80 which are used to connect the liner 12 to the stator of the gas turbine engine as shown in FIG. 1. The downstream section 52 also includes large holes 82 for providing cooling air to components downstream from the liner. Other features of the outer liner 12 are conventional and will not be described in further detail.

Figure 6:
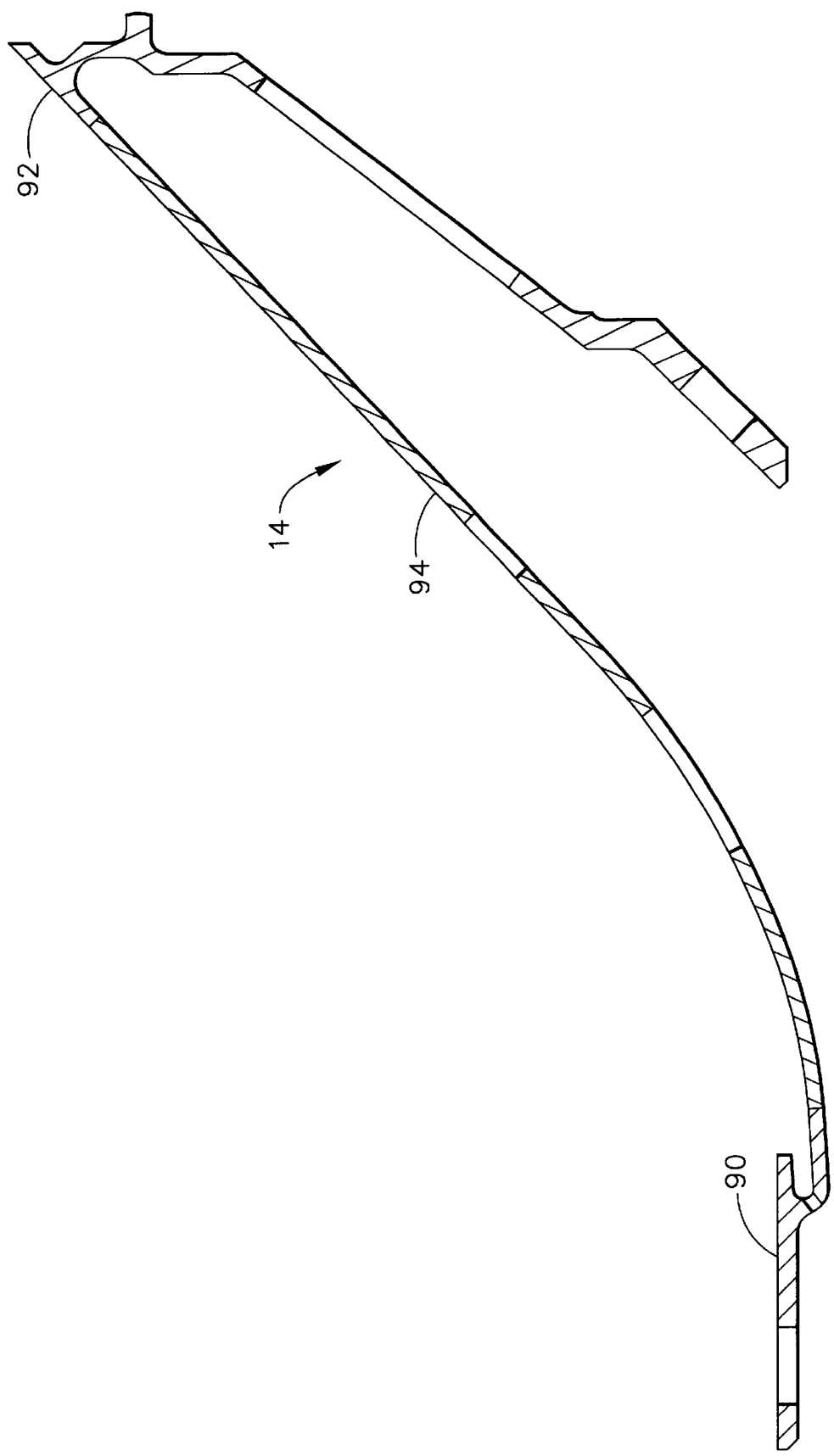
FIG. 6 is a vertical cross section of an inner combustion chamber liner.

FIG. 6 illustrates an inner liner 14 made by the method of the present invention. The inner liner 14 generally comprises a forged annular upstream section, a forged annular downstream section and an annular sheet metal section generally designated by 90, 92 and 94, respectively. These sections are concentric and surround a common centerline 96 (FIG. 1) which is coincident with the centerline of the gas turbine engine. The features and construction of the inner liner 14 are similar to those of the outer liner 12 and will not be described in further detail.

The outer and inner liners 12, 14 described above are made by similar methods. For brevity, only the method of forming the outer liner 12 will be described in detail. Forged stock is formed into annular rings roughly shaped like the upstream and downstream sections 50, 52 of the liner 12. The circumferential ends of the annular rings are joined by flash welding. Once the circumferential ends of the upstream and downstream sections 50, 52 are joined, the resulting rings are machined to the cross-sectional shapes shown in FIG. 2. Depending upon the shapes of the rings required to make the annular sections of the liner, they may be made in two or more pieces and welded together as will be described below.

A piece of sheet metal is formed into an annular ring having the shape of the sheet metal section 54 of the outer liner 12. The circumferential ends of the annular rings are joined by TIG welding. Alternatively, the sheet metal section 54 may made by forming two or more pieces of sheet metal into sectors and welding the ends of the sectors together to form a continuous ring. After the circumferential ends of the sheet metal section 54 are joined, the section is TIG welded to the partially machined upstream and downstream forged sections 50, 52 described above.

The assembled outer liner 12 is machined to the final part configuration shown in FIG. 2. The holes 62 at the forward end 20 of the liner 12 are positioned with respect to the seam 70 or seams such that the seam is at a preselected circumferential position with respect to the combustion chamber dome 16 when the liner 12 is connected to the combustion chamber dome. For instance, the holes which may be referred to as a Aregistration feature may be positioned so the seam 70 lies in an area of lower amplitude stress such as at an angular position around the liner centerline 56 between two of the fuel nozzles 26 as described above. The dome 16 has holes (not shown) having spacings and diameters which match those of the holes in the forward end 20 of the outer liner 12 so that proper alignment of the seam 70 and the dome is ensured during assembly of the dome and the liner. The holes 80 in the downstream flange are drilled and the other holes (i.e., film cooling holes 72, dilution holes 74 and large holes 82) are formed in the liner (e.g., by laser drilling and/or electrical discharge machining) to complete the method of making the outer liner 12.

As described above, the downstream section 52 may be made from three pieces 100, 102, 104 which are TIG welded together. In one preferred embodiment, the center piece 102 is sheet metal and the end pieces 100, 104 are forged. The end pieces 102, 104 are made by a method similar to that described above with respect to the upstream section 50. The center piece 102 is formed similarly to the sheet metal section 54, and the pieces 100, 102, 104 are joined by a method similar to that described above. When the downstream section 52 is fabricated in this way, the center piece 102 has at least one axial seam. (not shown) which is preferably positioned at a preselected circumferential position with respect to the combustion chamber dome 16 when the liner 12 is connected to the combustion chamber dome. For instance the seam may be positioned in a low stress area relative to large holes 82 in the downstream section 52.

When introducing elements of the present invention or the preferred embodiment(s) thereof, the articles "Aa", "Aan", "Athe" and "Asaid" are intended to mean that there are one or more of the elements. The terms "Acomprising", "Aincluding" and "Ahaving" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of fabricating an annular liner for a combustion chamber of a gas turbine engine in which fuel and flowpath gases are mixed and burned to heat the flowpath gases, the combustion chamber having a dome defining an upstream boundary of the combustion chamber and including at least two fuel nozzles for delivering fuel to the combustion chamber, the method comprising the steps of:

forming a metal piece into an annular section constituting at least a portion of said liner and having at least one seam extending generally axially with respect to an axial centerline of the liner;

machining an upstream end of the liner to have a registration feature for connecting the liner to the combustion chamber dome in at least one predetermined orientation with respect to the dome; and ensuring the registration feature and the seam are located relative to each other on the liner so that the seam is at a preselected position with respect to the combustion chamber dome when the liner is connected to the combustion chamber dome in said predetermined orientation;

wherein the fuel nozzles are spaced around the centerline of the liner when the liner is connected to the combustion chamber dome in said predetermined orientation, and the preselected position of the seam is at an angular position around the liner centerline between two of said fuel nozzles.

2. A method as set forth in claim 1 wherein the section has an area of higher amplitude stress and an area of lower amplitude stress during operation of the gas turbine engine, and the preselected position of the seam is in the area of lower amplitude stress.

3. A method as set forth in claim 1 wherein the angular position is midway between said two fuel nozzles.

4. A method as set forth in claim 1 wherein the seam is formed by welding.

5. A method as set forth in claim 1 wherein said annular section is a first annular section, the step of machining the upstream end of the liner is performed on a separate second annular section, and the method further comprises the step of inseparably joining said first and second annular sections.

6. A method as set forth in claim 5 wherein the step of inseparably joining said first and second annular sections is performed before the step of machining the upstream end of the liner to have the registration feature.

7. A method as set forth in claim 5 wherein the step of inseparably joining said first and second annular sections includes welding the first and second annular sections together.

8. A method of fabricating an annular liner for a combustion chamber of a gas turbine engine in which fuel and flowpath gases are mixed and burned to heat the flowpath gases, the combustion chamber having a dome defining an upstream boundary of the combustion chamber and including at least two fuel nozzles for delivering fuel to the combustion chamber, the method comprising the steps of:

forming a first metal piece into a first annular section having at least one welded seam extending generally axially with respect to an axial centerline of the liner;

forming a second metal piece into a second annular section;

joining said first and second annular sections; and machining an end of said second annular section after said first and second annular sections are joined to have a registration feature for connecting the liner to the combustion chamber dome in at least one predetermined orientation, said registration feature being located relative to the seam so the seam is at a preselected position with respect to the combustion chamber dome when the liner is connected to the combustion chamber dome in said predetermined orientation;

wherein the fuel nozzles are spaced around the centerline of the liner when the liner is connected to the combustion chamber dome in said predetermined orientation, and the preselected position of the seam is at an angular position around the liner centerline between two of said fuel nozzles.

9. A method as set forth in claim 8 wherein the section has an area of higher amplitude stress and an area of lower amplitude stress during operation of the gas turbine engine, and the preselected position of the seam is in the area of lower amplitude stress.

10. A method as set forth in claim 8 wherein the angular position is midway between said two fuel nozzles.

* * * * *